US012645096B2

(12) United States Patent
Gelfuso et al.

(10) Patent No.:  US 12,645,096 B2
(45) Date of Patent:  Jun. 2, 2026

(54) EYEGLASS ASSEMBLY FOR THE MOUNTING OF EYEGLASSES FROM A CAP

(71) Applicants: Russell Gelfuso, Warwick, RI (US); Marco Brunetti, Vicenza (IT)

(72) Inventors: Russell Gelfuso, Warwick, RI (US); Marco Brunetti, Vicenza (IT)

(73) Assignee: Russell Gelfuso, Warwick, RI (US)

( * ) Notice: Subject to any disclaimer, the term of this patent is extended or adjusted under 35 U.S.C. 154(b) by 0 days.

(21) Appl. No.: 19/055,802

(22) Filed: Feb. 18, 2025

(65) Prior Publication Data

US 2025/0231421 A1      Jul. 17, 2025

Related U.S. Application Data

(63) Continuation-in-part of application No. 18/121,244, filed on Mar. 14, 2023, now abandoned.

(60) Provisional application No. 63/565,676, filed on Mar. 15, 2024.

(51) Int. Cl.
G02C 3/02          (2006.01)
(52) U.S. Cl.
CPC ..................................... G02C 3/02 (2013.01)
(58) Field of Classification Search
None
See application file for complete search history.

(56) References Cited

U.S. PATENT DOCUMENTS

| | | | |
|---|---|---|---|
| 857,838 A | 6/1907 | Shaw | |
| 860,322 A | 7/1907 | Paroubek | |
| 2,609,538 A | 9/1952 | Jackson | |

| | | | | |
|---|---|---|---|---|
| 4,179,753 A | 12/1979 | Aronberg et al. | | |
| 4,893,919 A | 1/1990 | Nightingale | | |
| 5,052,054 A | 10/1991 | Birum | | |
| 5,615,413 A | 4/1997 | Bower | | |
| 5,933,862 A | 8/1999 | Landis | | |
| 6,019,468 A | 2/2000 | Altemare, Jr. | | |
| 6,739,718 B1 | 5/2004 | Jung | | |
| 6,757,914 B1 | 7/2004 | Kobashikawa | | |
| 7,216,972 B1 | 5/2007 | Gelfuso | | |
| 7,240,370 B2 * | 7/2007 | Lerner | ..................... | G02C 3/02 |
| | | | | 351/59 |
| 7,325,920 B1 | 2/2008 | Gelfuso | | |
| 9,049,896 B2 * | 6/2015 | Huh | ........................ | A42B 3/185 |
| 10,935,811 B2 * | 3/2021 | Asemani | ................ | F16M 13/04 |

(Continued)

FOREIGN PATENT DOCUMENTS

CN          112255821          1/2021

*Primary Examiner* — Darryl J Collins
(74) *Attorney, Agent, or Firm* — Salter & Michaelson

(57)          ABSTRACT

In the present invention there is provided an eyeglass assembly for the mounting of eyeglasses from a cap, wherein the cap includes an interior peripheral rim that defines an upper rim edge that the eyeglasses are supported from, and wherein the eyeglasses include a pair of eye pieces and associated pair of temples. The eyeglass assembly includes an eyeglass frame; a clip that includes a pair of clip side flanges connected at a clip bridge piece so that the clip is formed substantially in an inverted U-shape for disposition over the upper rim edge; at least one hinge for support of the temple relative to the clip; the temple having opposed ends including an end supported from the clip and another end; an elongated support bar having a center section that is attached with a center section of the eyeglass frame.

18 Claims, 22 Drawing Sheets

(56)         References Cited

U.S. PATENT DOCUMENTS

| 11,209,667 | B1 * | 12/2021 | Green | ...................... | G02C 3/02 |
| D946,572 | S * | 3/2022 | Asemani | ...................... | D14/372 |
| 2009/0219479 | A1 * | 9/2009 | Tsai | ........................ | G02C 9/04 |
| | | | | | 351/57 |

* cited by examiner

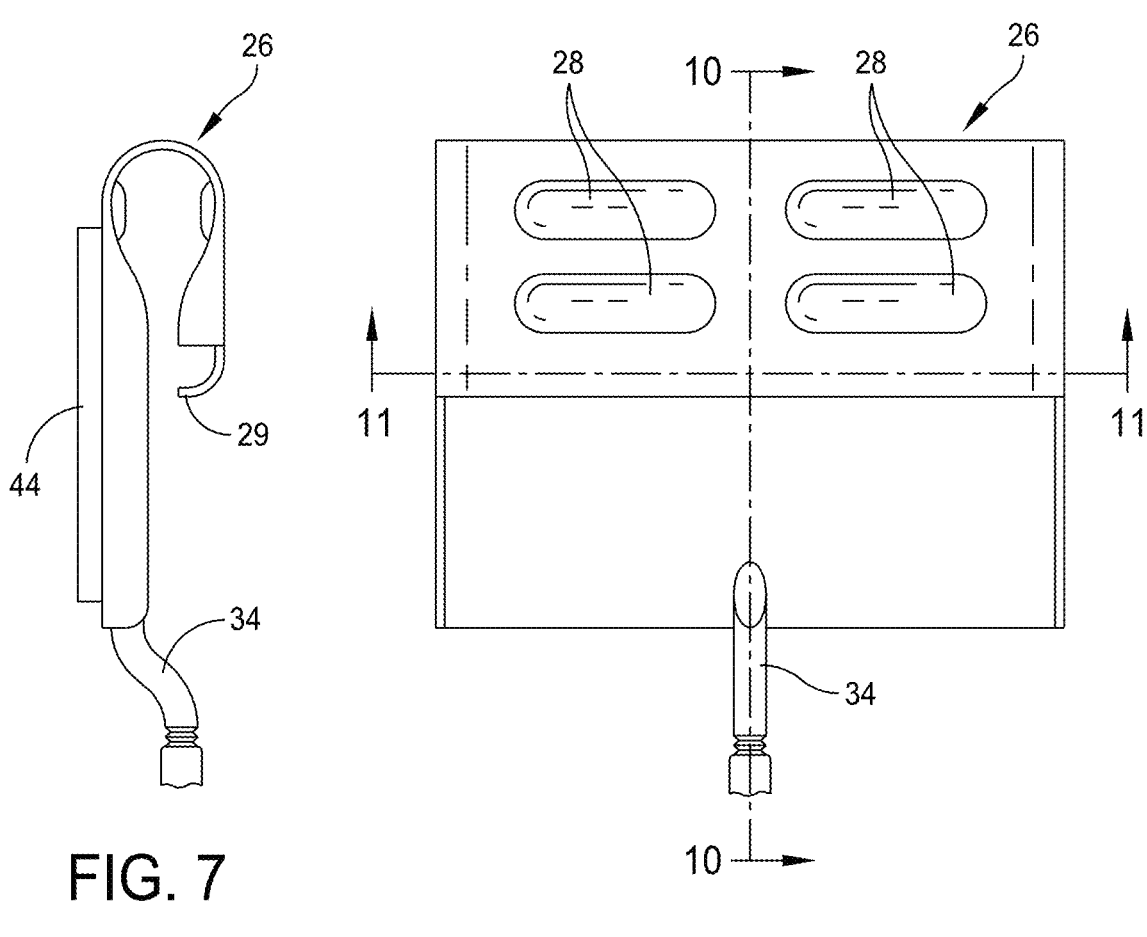
FIG. 7
FIG. 8
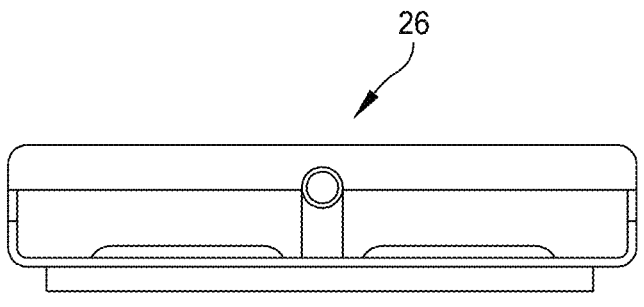
FIG. 9

EYEGLASS ASSEMBLY FOR THE MOUNTING OF EYEGLASSES FROM A CAP

CROSS-REFERENCE TO RELATED APPLICATIONS

This application is a continuation-in-part (CIP) of U.S. Ser. No. 18/121,244 filed on Mar. 14, 2023.

Priority for this application is hereby claimed under 35 U.S.C. § 119 (e) to commonly owned and U.S. Provisional Patent Application No. 63/565,676 which was filed on Mar. 15, 2024 which is incorporated by reference herein in its entirety.

FIELD OF THE INVENTION

The present invention relates in general to an eyeglass assembly for mounting eyeglasses to a cap. More particularly, the present invention relates to an eyeglass assembly that improves the mounting arrangement of the eyeglass assembly.

BACKGROUND OF THE INVENTION

This invention relates to a pair of glasses adapted to be attached to caps worn by humans and more specifically for utilization when caps are worn backwards, that is, with the cap's brim or visor facing to the rear. Visored caps such as baseball caps and the like have realized increased acceptance and importance in today's culture, and the habit of wearing such caps in the rearward position, that is, with the visor portion placed to the rear, is popular. It is also popular to mount eyeglasses, safety glasses and sunglasses to such caps such that the glasses may be disposed in a storage position and then pivoted or otherwise disposed to a use position with respect to the wearer, i.e., combination visored cap with glasses mounted thereon.

Despite the popularity of wearing such visored caps in the rearward position, the construction of the glasses to be mounted thereon are almost entirely structured so as to be clipped, suspended or otherwise attached or function with respect to the cap's brim or visor. Thus mounted, the glasses so attached to the cap will, of course, be proximate to the rear of the person's head when the cap is disposed in the rearward position and thus rendering the functionality of such mounted glasses useless. Examples of such visor or brim-oriented glasses/cap mountings include those shown in the following U.S. patents: U.S. Pat. No. 857,838 issued Jun. 25, 1907; U.S. Pat. No. 4,179,753 issued Dec. 25, 1979; U.S. Pat. No. 5,052,054 issued Oct. 1, 1991; U.S. Pat. No. 5,615,413 issued Apr. 1, 1997; U.S. Pat. No. 5,933,862 issued Aug. 10, 1999; U.S. Pat. No. 6,739,718 issued May 24, 2004; and U.S. Pat. No. 6,757,914 issued Jul. 6, 2004.

While some attempts have been made to provide glasses which include some attachment mechanism to enable use while the hat or cap's brim faces to the back or towards either side, the need still exists for a pair of glasses adapted for attachment to a cap such that the wearer may utilize the glasses when the cap is worn in the rearward facing position in a simple, straightforward and intuitively functional manner.

Refer also to the inventor's own U.S. Pat. Nos. 7,216,972 and 7,325,920. The present invention is considered as an improvement over the products described in these two patents. The improvement relates to, inter alia, the firm engagement of the device for providing an improved support from the cap.

SUMMARY OF THE INVENTION

In accordance with the present invention there is provided an eyeglass assembly for the mounting of eyeglasses from a cap, wherein the cap includes an interior peripheral rim that defines an upper rim edge that the eyeglasses are supported from, and wherein said eyeglasses include a pair of eye pieces and associated pair of temples, said eyeglass assembly comprised of:

a. a clip that includes a pair of clip side flanges connected at a clip bridge piece so that the clip is formed substantially in an inverted U-shape for disposition over the upper rim edge;

b. a non-slip insert including a pair of side flanges connected by a bridge piece so that the non-slip insert is formed substantially in an inverted U-shape for disposition inside the inverted U-shaped clip;

c. both of said clip and non-slip insert having indentations forming respective bumps so that the bumps of the non-slip insert engage with opposite sides of the interior peripheral rim of the cap while the bumps of the clip engage with respective insert side flanges.

In accordance with other aspects of the present invention including a pad that is secured to the clip; including a temple connector that connects the temple of the eyeglass to a base of the clip; wherein the temple connector comprises a temple support piece, and further including a post that extends from the clip to the temple support piece; wherein a free end of the post is threaded for engagement with a threaded hole of the temple support piece; wherein the temple support piece includes a pivot connection that allows the eyeglasses to pivot away from the eyes; wherein the post has a S-shaped contour; wherein one of the clip flanges is longer than the other and has a pad attached thereto; wherein the clip flanges have opposed side lips for engagement with the non-slip insert; and wherein the temple connector comprises a temple support piece, and further including a post that extends from the clip to the temple support piece, and wherein the temple support piece includes a pivot connection that allows the eyeglasses to pivot away from the eyes.

Also in accordance with the present invention there is provided a combination of a cap that is worn by a user, a pair of eyeglasses and an eyeglass assembly for the mounting of the eyeglasses from the cap, wherein the cap includes an interior peripheral rim that defines an upper rim edge that the eyeglasses are supported from, and wherein said eyeglasses include a pair of eye pieces and associated pair of temples, said eyeglass assembly comprised of:

a. a clip that includes a pair of clip side flanges connected at a clip bridge piece so that the clip is formed substantially in an inverted U-shape for disposition over the upper rim edge;

b. a non-slip insert including a pair of side flanges connected by a bridge piece so that the non-slip insert is formed substantially in an inverted U-shape for disposition inside the inverted U-shaped clip;

c. both of said clip and non-slip insert having indentations forming respective bumps so that the bumps of the non-slip insert engage with opposite sides of the interior peripheral rim of the cap while the bumps of the clip engage with respective insert side flanges.

In accordance with other aspects of the combination of the present invention; including a pad that is secured to the clip; including a temple connector that connects the temple of the eyeglass to a base of the clip; wherein the temple connector comprises a temple support piece, and further including a post that extends from the clip to the temple support piece;

wherein a free end of the post is threaded for engagement with a threaded hole of the temple support piece; wherein the temple support piece includes a pivot connection that allows the eyeglasses to pivot away from the eyes; wherein the post has a S-shaped contour; wherein one of the clip flanges is longer than the other and has a pad attached thereto; wherein the clip flanges have opposed side lips for engagement with the non-slip insert; and wherein the temple connector comprises a temple support piece, and further including a post that extends from the clip to the temple support piece, and wherein the temple support piece includes a pivot connection that allows the eyeglasses to pivot away from the eyes.

In accordance with another embodiment of the present invention there is provided an eyeglass assembly for the mounting of eyeglasses from a cap, wherein the cap includes an interior peripheral rim that defines an upper rim edge that the eyeglasses are supported from, and wherein said eyeglasses include a pair of eye pieces and associated pair of temples, said eyeglass assembly. The eyeglass assembly includes an eyeglass frame; a clip that includes a pair of clip side flanges connected at a clip bridge piece so that the clip is formed substantially in an inverted U-shape for disposition over the upper rim edge; at least one hinge for support of the temple relative to the clip; said temple having opposed ends including an end supported from the clip and an other end; an elongated support bar having a center section that is attached with a center section of the eyeglass frame; said elongated support bar having opposed ends that attach with the respective other end of each temple.

In accordance with further aspects of the present invention, including at least two hinges at opposed ends of the temple; including one hinge at each end of the elongated support bar; wherein the eyeglass frame is selectively removable from the elongated support bar in order to exchange eyeglass frames; wherein the elongated support bar has a downwardly extending tab attached from the center section of the elongated support bar; wherein the center section of the eyeglass frame is enlarged in comparison to the rest of the eyeglass frame, and further including a hole in the enlarged center section dimensioned to receive the tab in order to interlock the elongated support bar with the eyeglass frame; further including an engagement button that engages with a facial surface of the enlarged center section of the eyeglass frame, and for engagement with the tab in order to lock the elongated support bar with the eyeglass frame; wherein the engagement button has a post that engages with a hole in the tab; wherein the elongated support bar attaches only at the tab to the eyeglass frame; and including one hinge at each end of the elongated support bar.

In accordance with another embodiment of the present invention is a combination of a cap that is worn by a user, an eyeglass frame and an eyeglass assembly for the mounting of the eyeglass frame from the cap, wherein the cap includes an interior peripheral rim that defines an upper rim edge that the eyeglasses are supported from, and wherein said eyeglass frame include a pair of eye pieces and associated pair of temples.

The eyeglass assembly includes a clip that includes a pair of clip side flanges connected at a clip bridge piece so that the clip is formed substantially in an inverted U-shape for disposition over the upper rim edge; the temple having opposed ends including an end supported from the clip and an other end; an elongated support bar having a center section that is attached with a center section of the eyeglass frame; said elongated support bar having opposed ends that attach with the respective other end of each temple.

In accordance with still further aspects of the present invention wherein each temple includes at opposite ends thereof the end pieces P and R, and further including a hinge H1 that is provided between the temple bar B and the end piece R, and a second hinge H2 that is provided between the temple bar B and the p end piece P. Refer in at least two hinges at opposed ends of the temple; further including a hinge H3 is provided between the end piece P and the clip; wherein the eyeglass frame is selectively removable from the elongated support bar in order to exchange eyeglass frames, and the elongated support bar center section is attached only at a center section of the eyeglass frame; wherein the elongated support bar has a downwardly extending tab attached from the center section of the elongated support bar; wherein the center section of the eyeglass frame is enlarged in comparison to the rest of the eyeglass frame, and further including a hole in the enlarged center section dimensioned to receive the tab in order to interlock the elongated support bar with the eyeglass frame; further including an engagement button that engages with a facial surface of the enlarged center section of the eyeglass frame, and for engagement with the tab in order to lock the elongated support bar with the eyeglass frame; wherein the engagement button has a post that engages with a hole in the tab; wherein the elongated support bar attaches only at the tab to the eyeglass frame; including one hinge at each end of the elongated support bar.

BRIEF DESCRIPTION OF DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 7 is a side view of the clip;

FIG. 8 is a front view of the clip;

FIG. 9 is a bottom view of the clip;

DETAILED DESCRIPTION OF THE INVENTION

Figure 1:
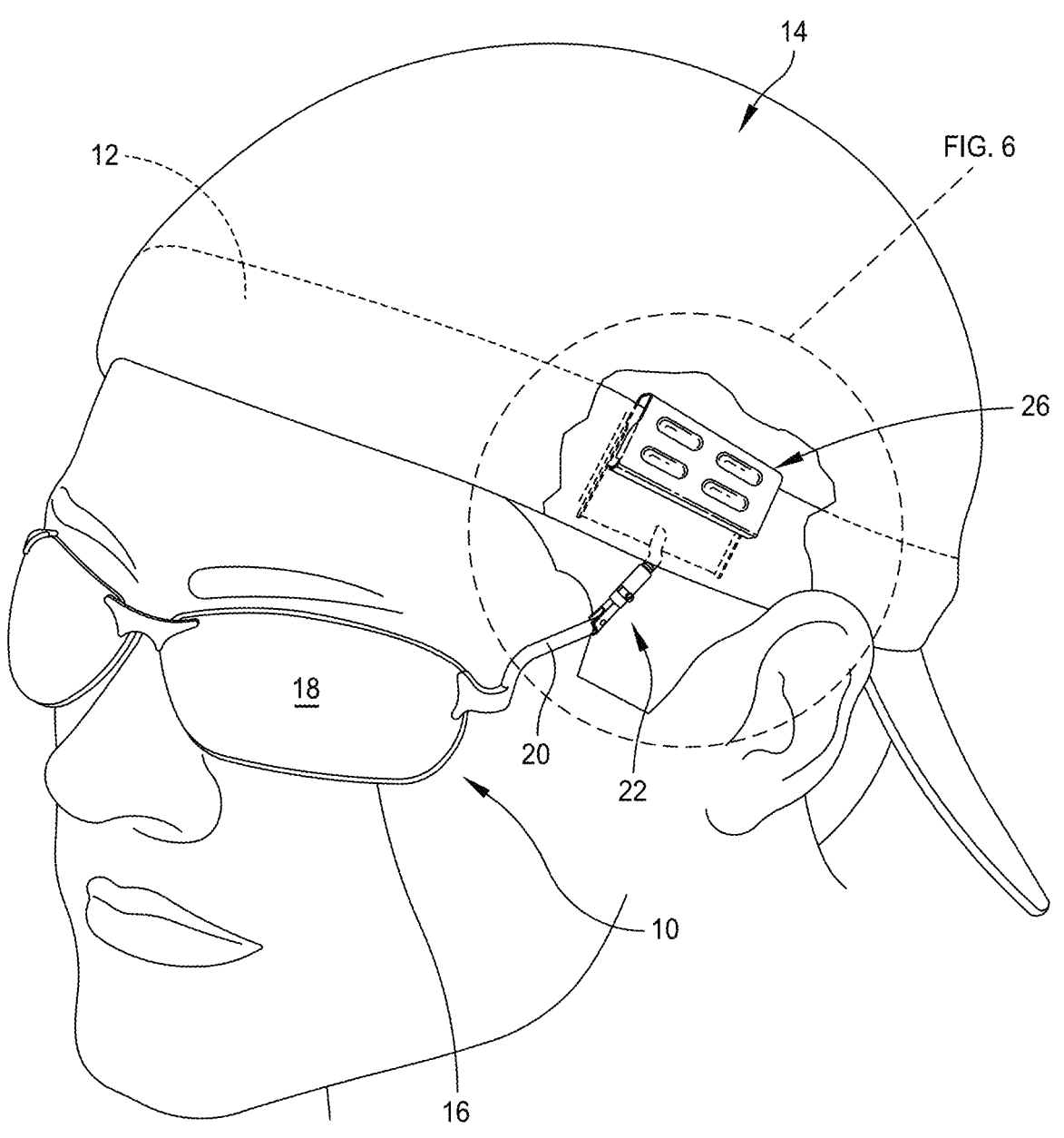
FIG. 1 is a perspective view illustrating the eyeglass assembly for the support of eyeglasses from the rim of a cap.

Reference is now made to the drawings for an illustration of the eyeglass assembly of the present invention. This eyeglass assembly is for the mounting of a pair of eyeglasses 10 from a cap 14. The cap includes an interior peripheral rim 15 that defines an upper rim edge 17 that the eyeglasses are supported from. The eyeglasses include a frame 16 and a pair of eye pieces 18.

The eyeglass assembly is comprised of a clip 26 that includes a pair of clip side flanges 27 and a clip bridge piece 39 so that the clip is formed substantially in an inverted U-shape for disposition over the non-slip insert and in turn over the upper rim edge 17. Both the clip and the non-slip insert have indentations forming respective bumps so the bumps of the non-slip insert engage with opposite sides of the interior peripheral rim of the cap while the bumps of the clip engage with respective side flanges, and in particular the indentations thereof.

Figure 2:
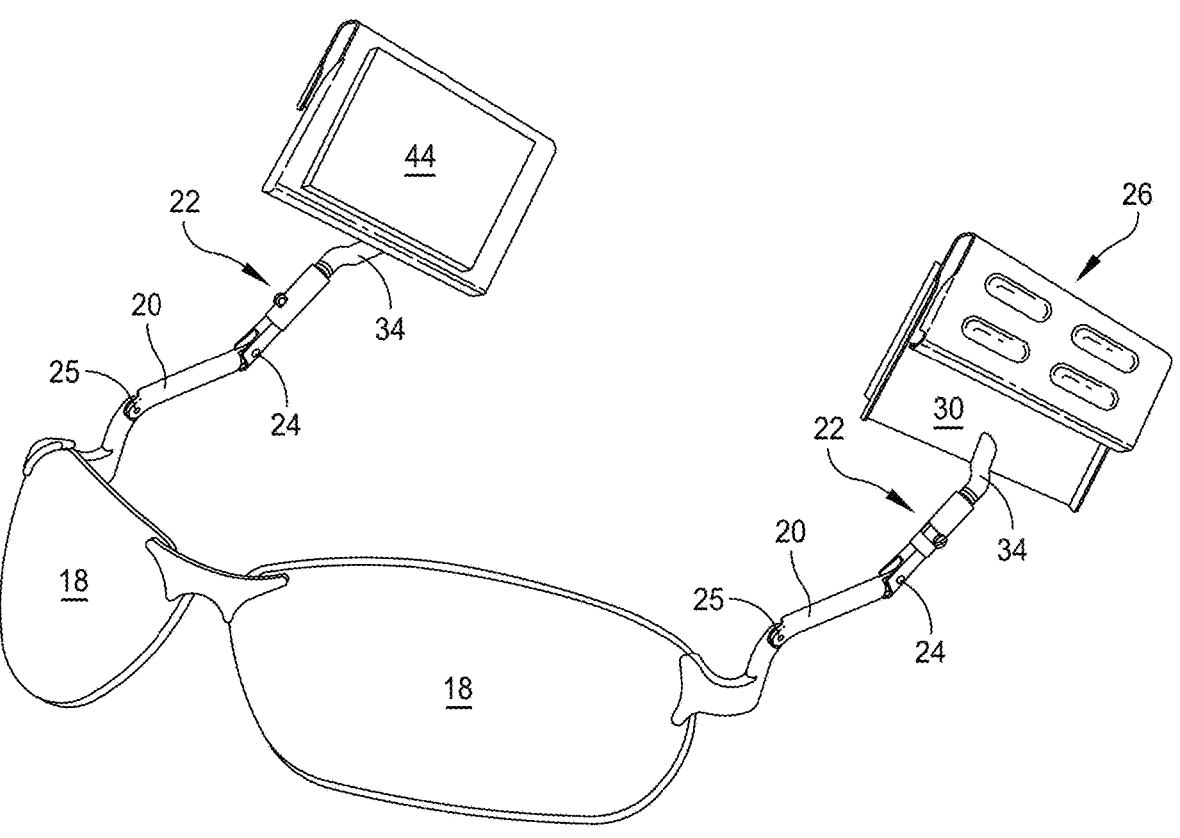
FIG. 2 is a perspective view of the pair of eyeglass assemblies for engagement with opposite portions of the rim of the cap.

FIG. 1 is a perspective view illustrating the eyeglass assembly for the support of eyeglasses from the rim of a cap. FIG. 2 is a perspective view showing the eyeglass assembly which includes a temple connector 22 for connecting the temple 20 of the eyeglass to the clip 26. FIG. 2 also illustrates the cushioning pad 44 that provides enhanced comfort against the head of the user. Note in FIG. 2 the two pivots 24 and 25. Pivot 24 in particular allows the eye lenses or eye pieces to be adjusted to different angles when the cap is raised or lowered.

Figure 3:
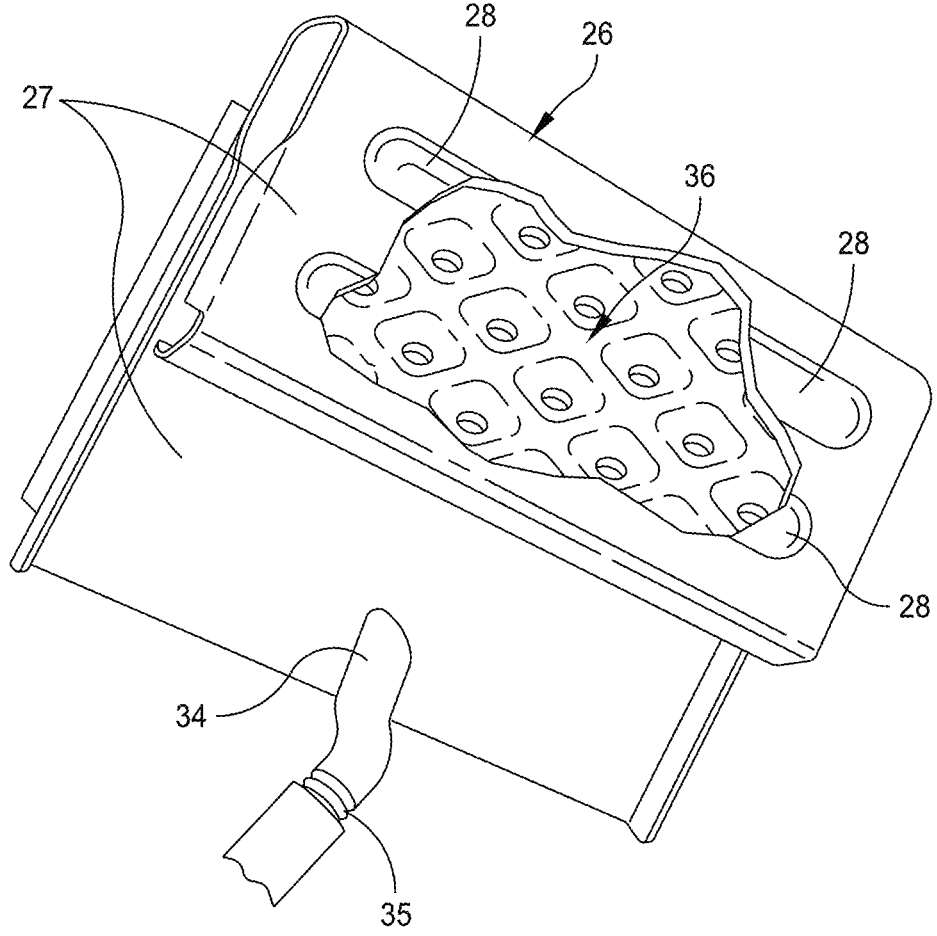
FIG. 3 is a perspective view illustrating the support clip of the present invention partially cut away to also illustrate the non-slip insert.
Figure 4:
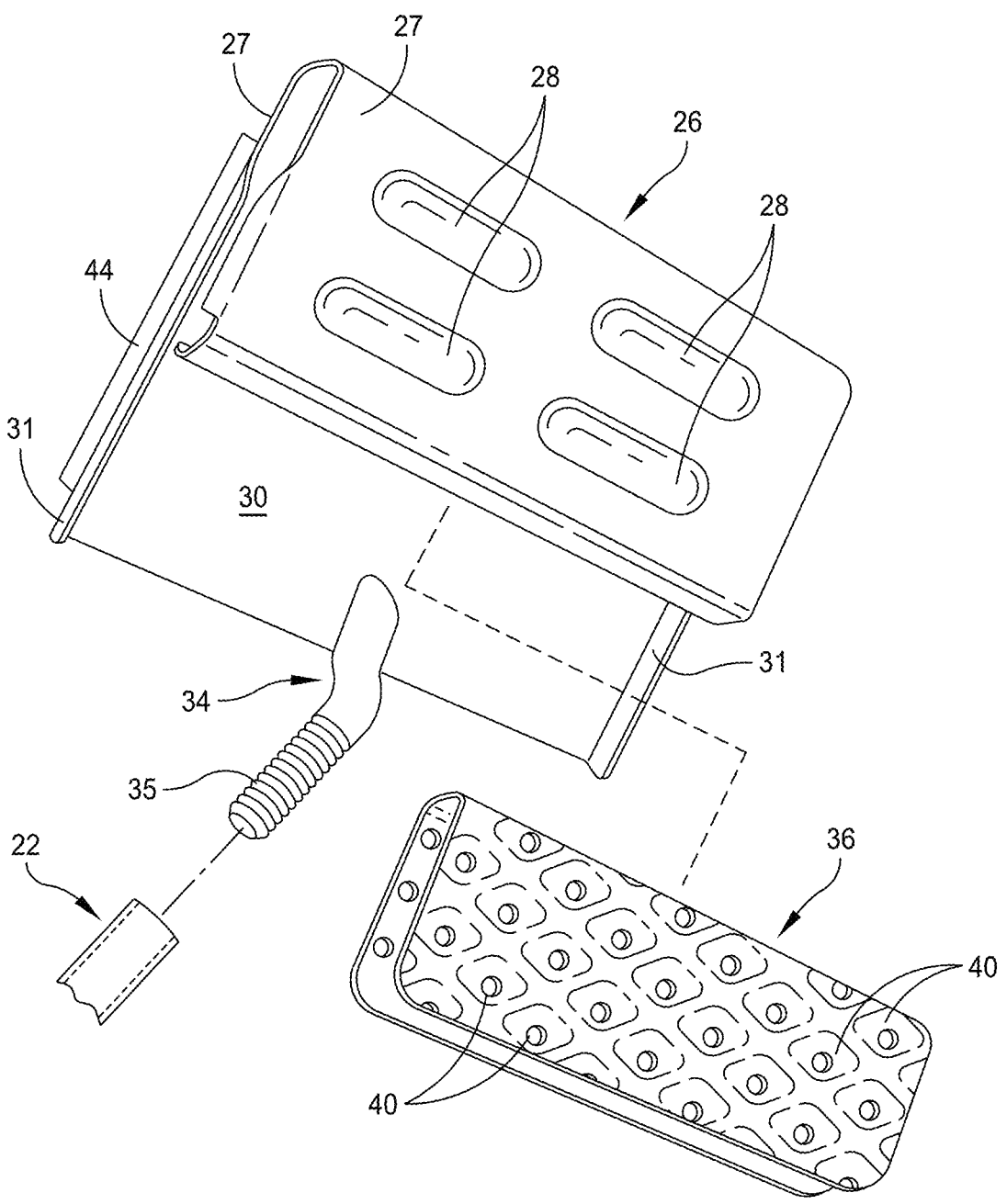
FIG. 4 is a perspective exploded view showing the clip and the non-slip insert.
Figure 5:
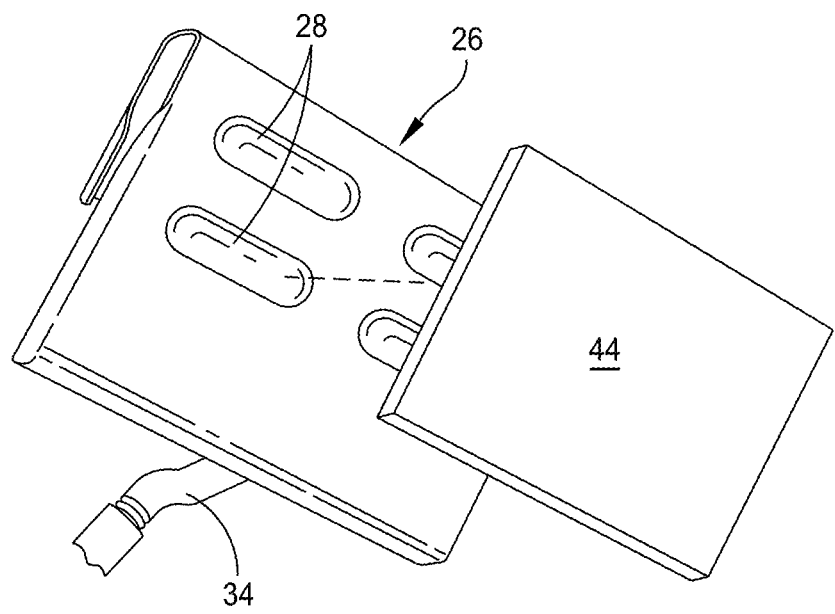
FIG. 5 is a partial perspective view of one side of the clip.
Figure 6:
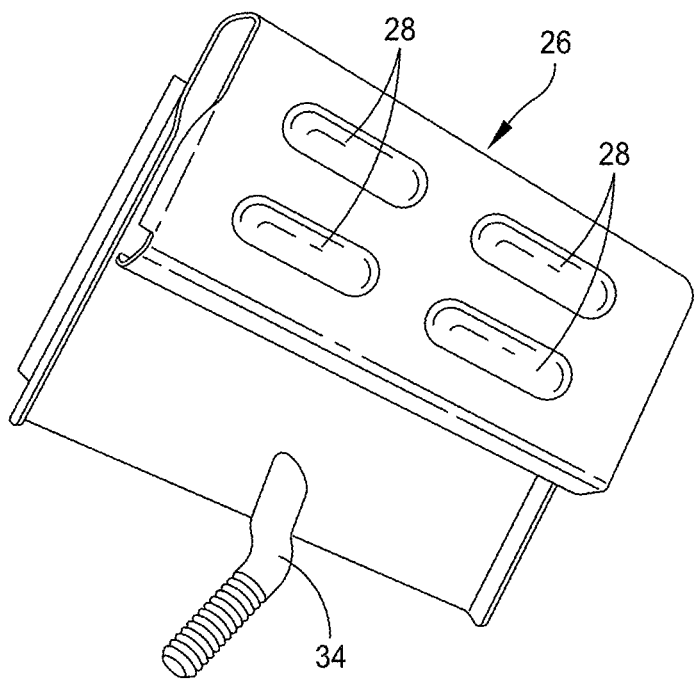
FIG. 6 is a partial perspective view of the opposite side of the clip.

FIG. 3 is a perspective view illustrating the support clip of the present invention partially cut away so as to illustrate the non-slip insert at 36. FIG. 4 is a perspective view exploded away from the clip 26. In FIG. 4 also note side lips 33. These side lips 33 are helpful in guiding the clip over the non-slip insert. FIG. 5 is a perspective view showing the clip on one side where the pad 44 is secured. The pad 44 may be secured by an adhesive. In this regard also refer to the cross-sectional view of FIG. 18. FIG. 6 is a perspective view showing the opposite side of the clip with the associated clip indentations 28.

Figure 10:
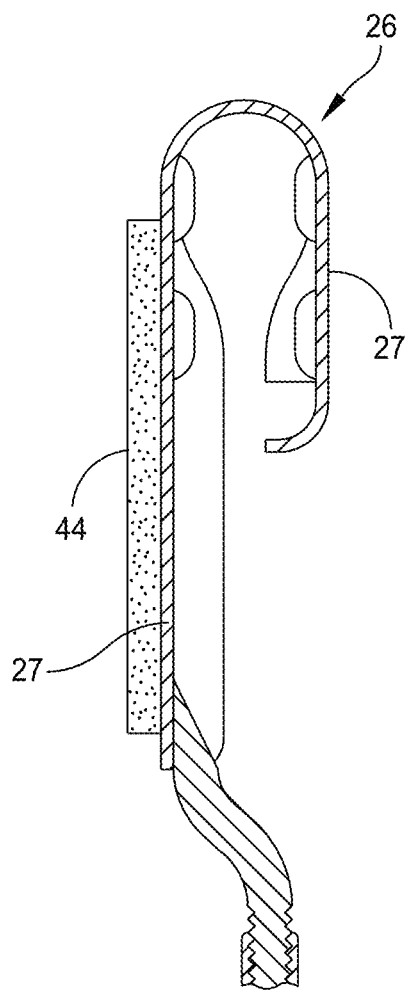
FIG. 10 is a side cross-sectional view taken along line 10-10 of FIG. 8 showing the clip without the non-slip insert.
Figure 11:
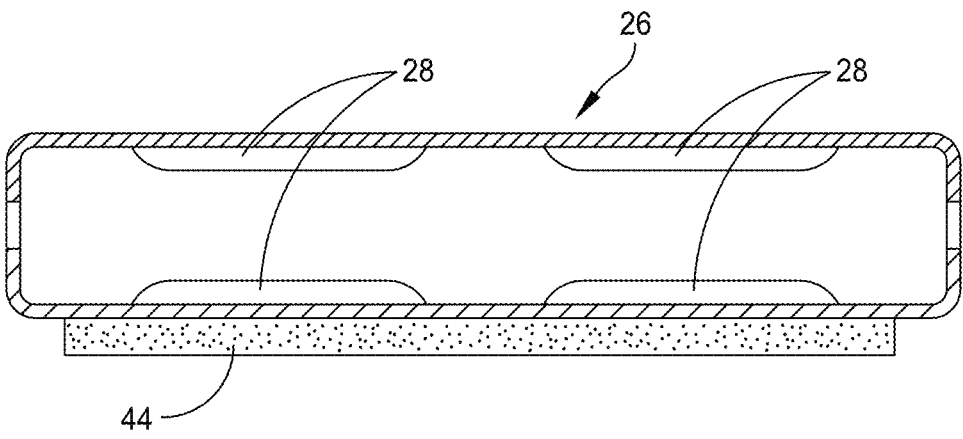
FIG. 11 is a cross-sectional view taken along line 11-11 of FIG. 8.

FIG. 7 is a side view of the clip 26. FIG. 8 is a front view of the clip 26. FIG. 9 is a bottom view of the clip 26. FIG. 10 is a side cross-sectional view taken along line 10-10 of FIG. 8 showing the clip without the non-slip insert. FIG. 11 is a cross-sectional view taken along line 11-11 of FIG. 8.

Figure 12:
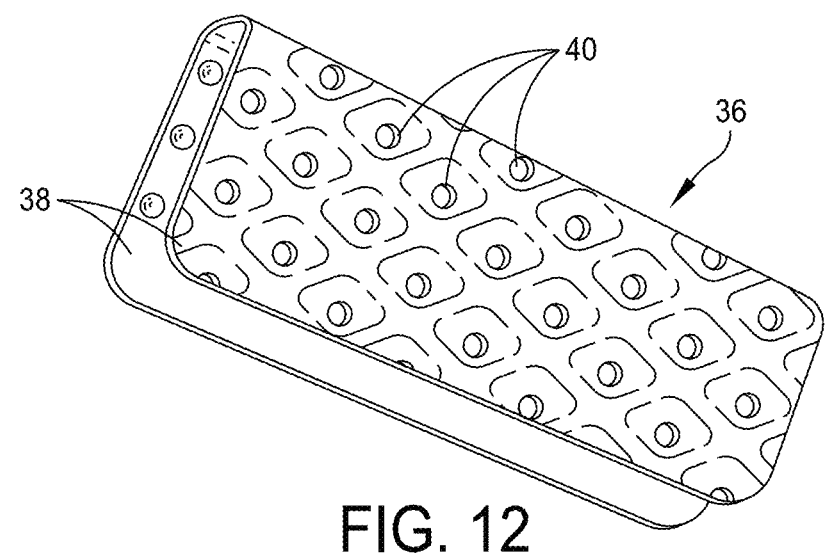
FIG. 12 is a perspective view of the non-slip insert.
Figure 13:
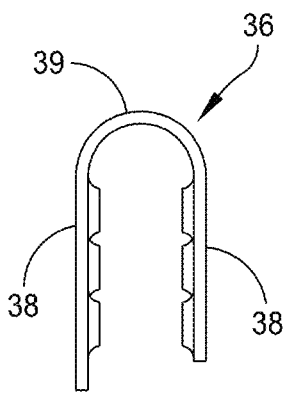
FIG. 13 is a side view of the non-slip insert.
Figure 14:
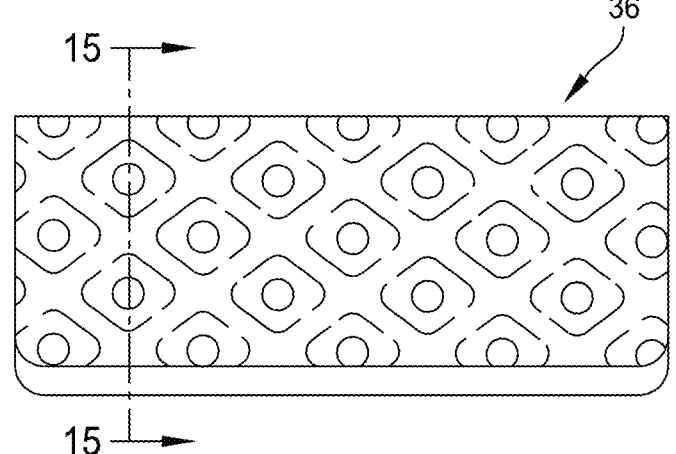
FIG. 14 is a front view of the non-slip insert.
Figure 15:
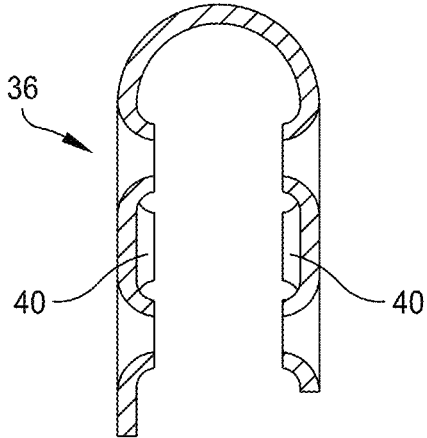
FIG. 15 is a cross-sectional view taken along line 15-15 of FIG. 14.

FIG. 12 is a perspective view of the non-slip insert alone. FIG. 12 illustrates the opposed side flanges 38 as well as a bridge at 39. FIG. 13 is a side view of the non-slip insert. FIG. 14 is a front view of the non-slip insert. FIG. 15 is a cross-sectional view taken along line 15-15 of FIG. 14.

Figure 16:
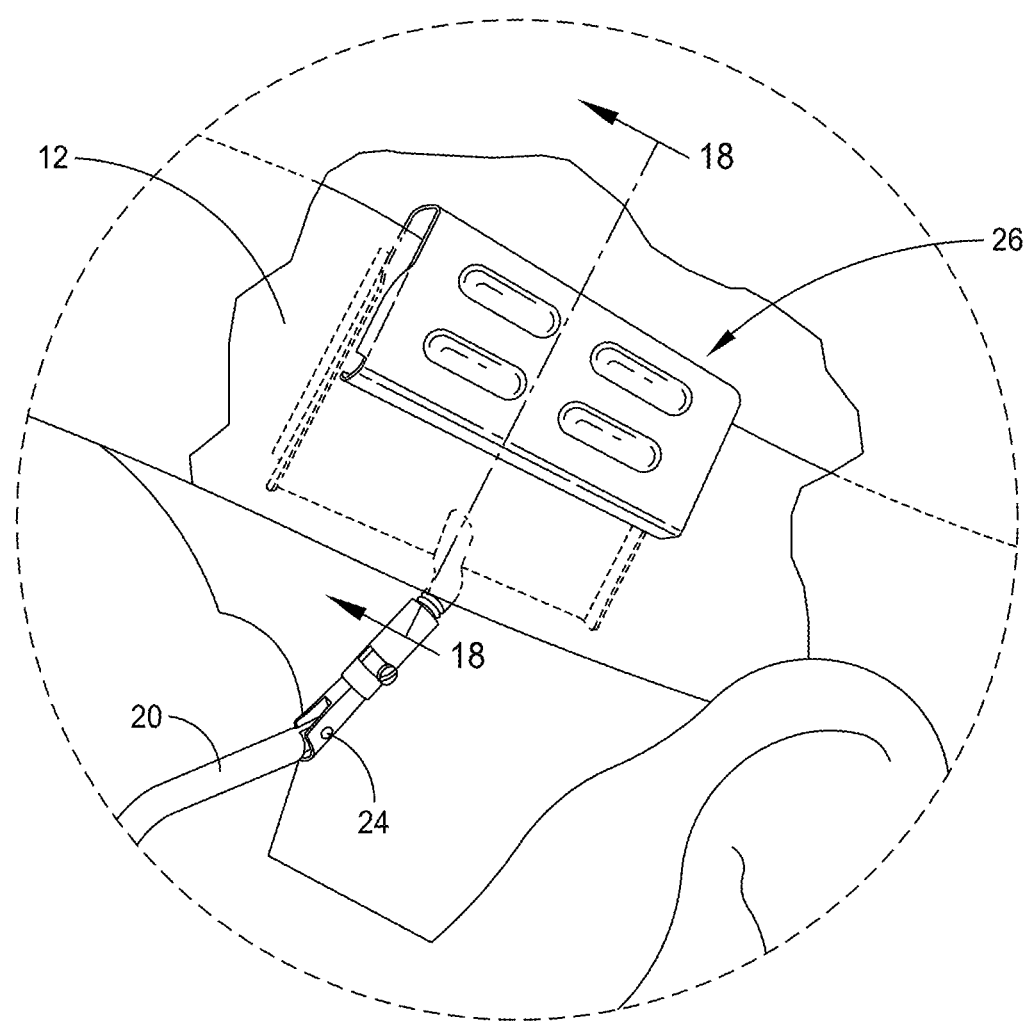
FIG. 16 is an enlarged view of the clip as attached to the cap.
Figure 17:
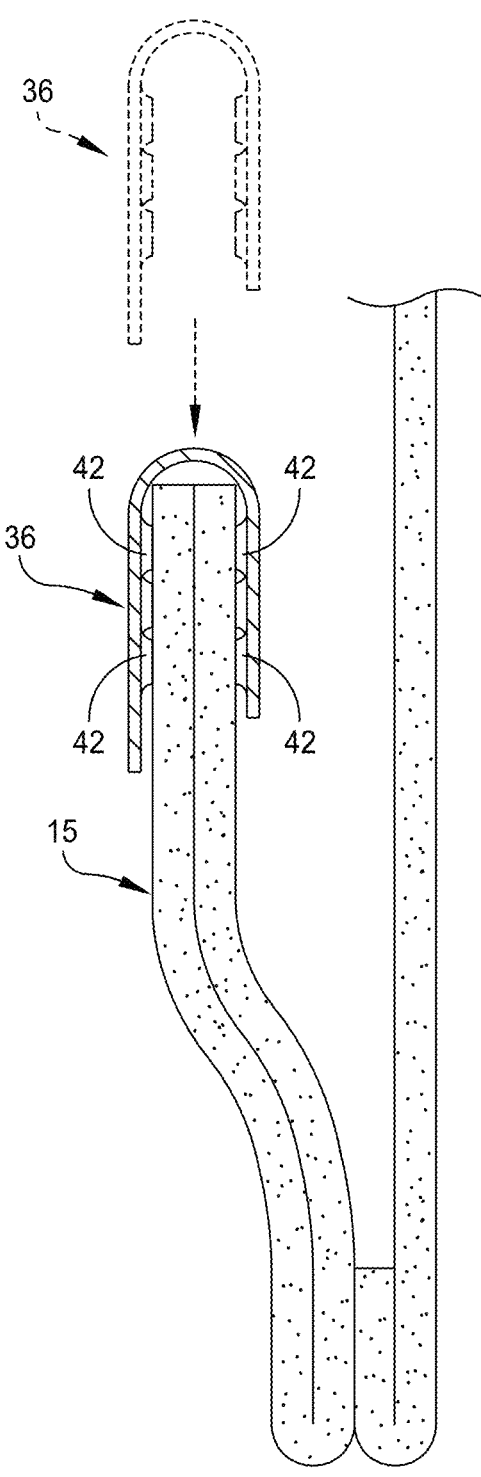
FIG. 17 is a cross-sectional view showing the non-slip insert engaged with the cap rim.
Figure 18:
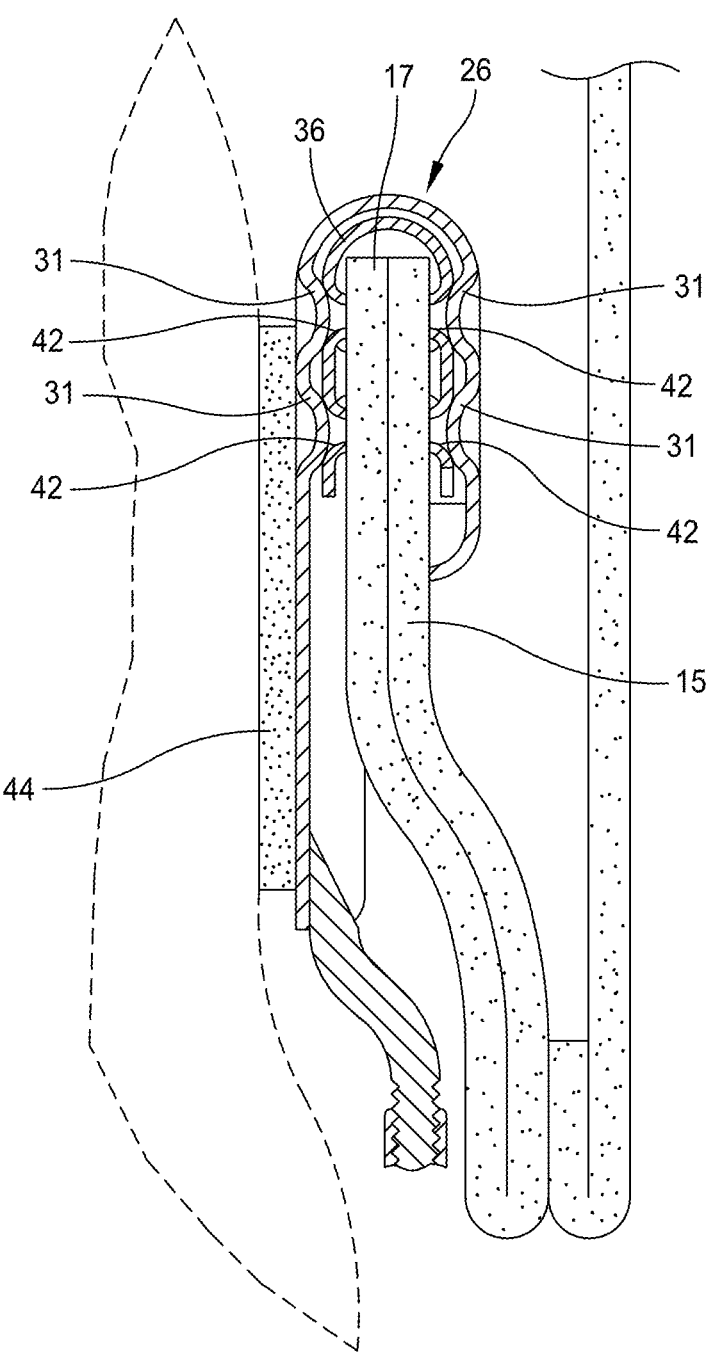
FIG. 18 is a cross-sectional view showing th clip being placed over the non-slip insert with interlocking indentations/bumps.

FIG. 16 is an enlarged view of the clip as engaged with the rim of the cap. FIG. 17 is a cross-sectional view showing the non-slip insert engaged with the cap rim. FIG. 18 is a cross-sectional view taken along line 18-18 of FIG. 16 illustrating the clip being placed over the non-slip insert.

One of the features of the present invention is the manner in which the indentations and bumps are formed both on the clip and on the insert. This is clearly illustrated in the cross-sectional view of FIG. 18 wherein the bump 31 of the clip is aligned with an insert indentation 40. The bump 42 of the insert thus rests against the rim 15. This arrangement enhances the gripping action of the clip and insert with the rim of the cap.

Figure 19:
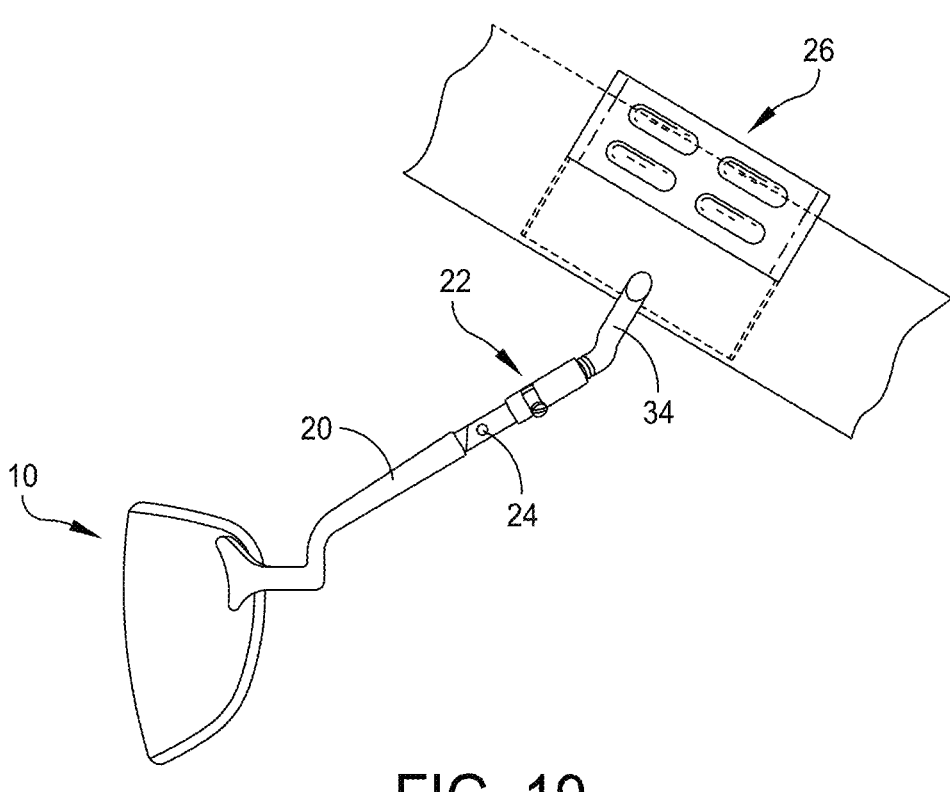
FIG. 19 is a side view of the eyeglass assembly when in use.
Figure 20:
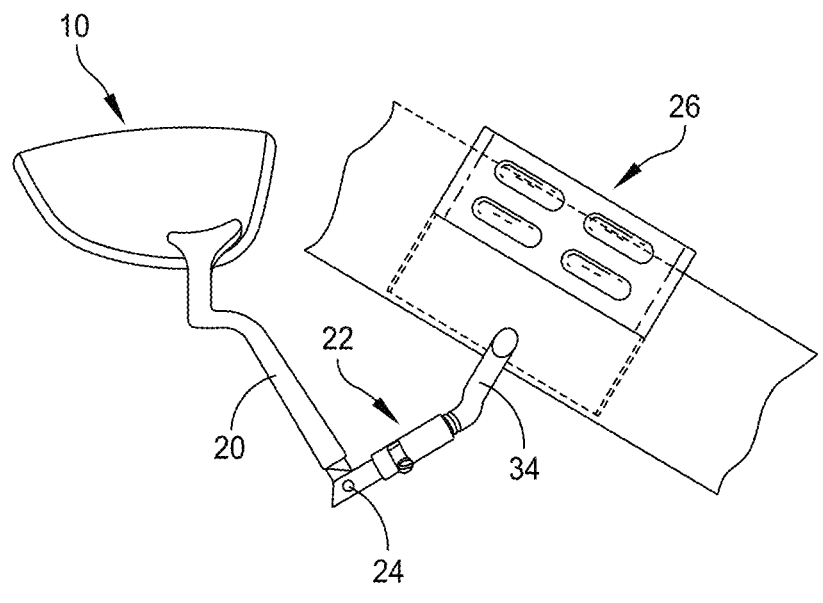
FIG. 20 is a side view of the eyeglass assembly when tilted away from use.

FIG. 19 is a side view of the eyeglass assembly when in use. In other words, in FIG. 19 the eyeglasses are disposed over the eye of the user. FIG. 20 is a side view of the eyeglass assembly once tilted upwardly at pivot 24 so that the eyeglasses are no longer engaged with the eye of the user but are moved upwardly out of the way.

Figures 21, 22, 23:
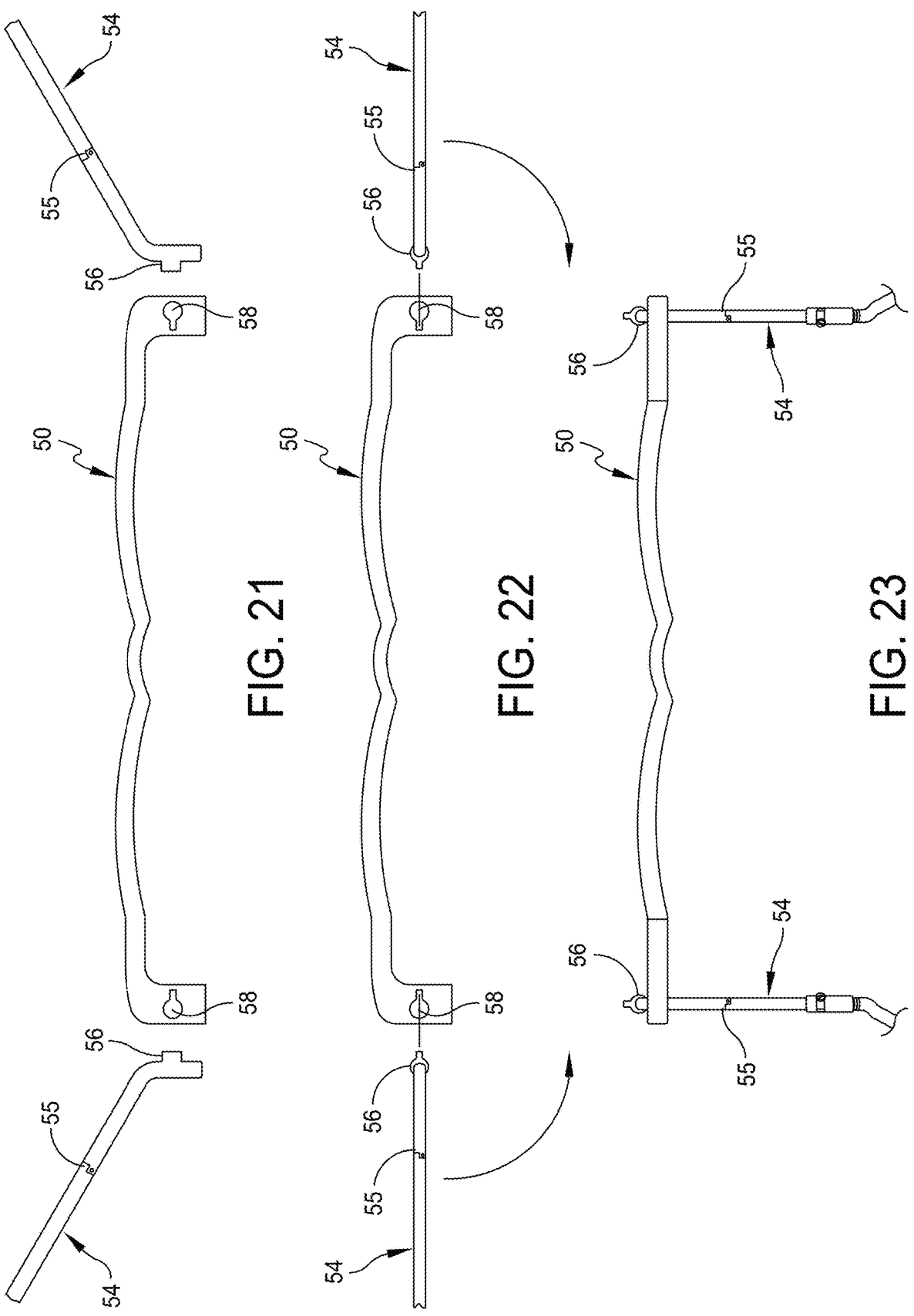
FIG. 21 is a schematic front view illustrating another concept of the present invention.
FIG. 22 is a front view showing the respective temples with end tabs being inserted into slots in the frame.
FIG. 23 is a top view showing the temples locked in place.

Reference is now made to FIGS. 21-23 for another important aspect of the present invention in which the temples 54 can be engaged and disengaged with the eyeglass frame 50. In this way, one can substitute different types or styles of frames with any particular set of temples. Thus, this embodiment allows a pair of temples to attach to multiple frames. These frames can be of many different types such as readers, safety glasses or sunglasses.

With further reference to FIGS. 21-23, the temples 54 have their ends 56 inserted into the slots 58 in the frame. The slots may be provided on the front of the frames. The temples may be inserted in line with the front of the frame. Each temple is pushed down passed the end tab swinging toward each other which locks the temples in place relative to the frame. In an alternate embodiment, one can provide a threaded screw in place of the tab. This threaded screw allows room for a nut to hold the temple in place. On each temple there may also be provided an additional hinge joint 55 such as illustrated in FIGS. 21-23.

Figure 24:
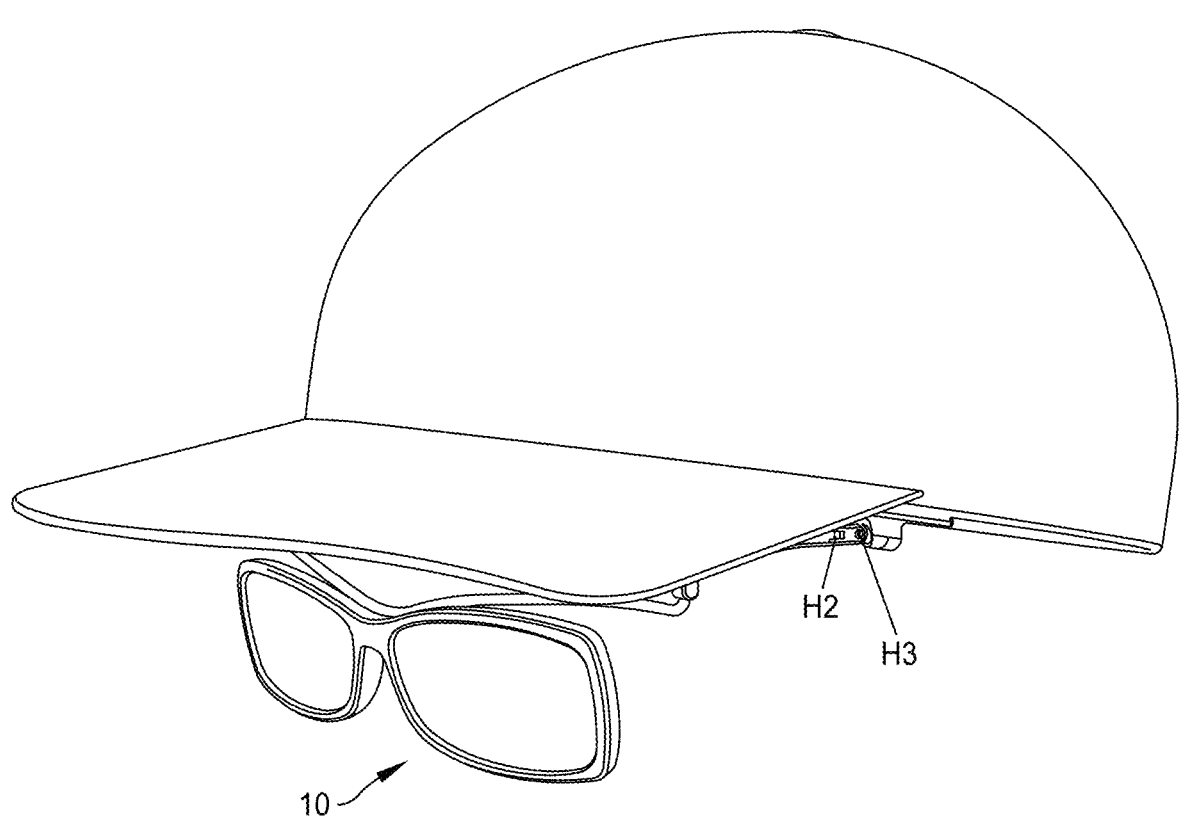
FIG. 24 is a front perspective of a new embodiment showing hinge H2 and hinge H3.
Figure 25:
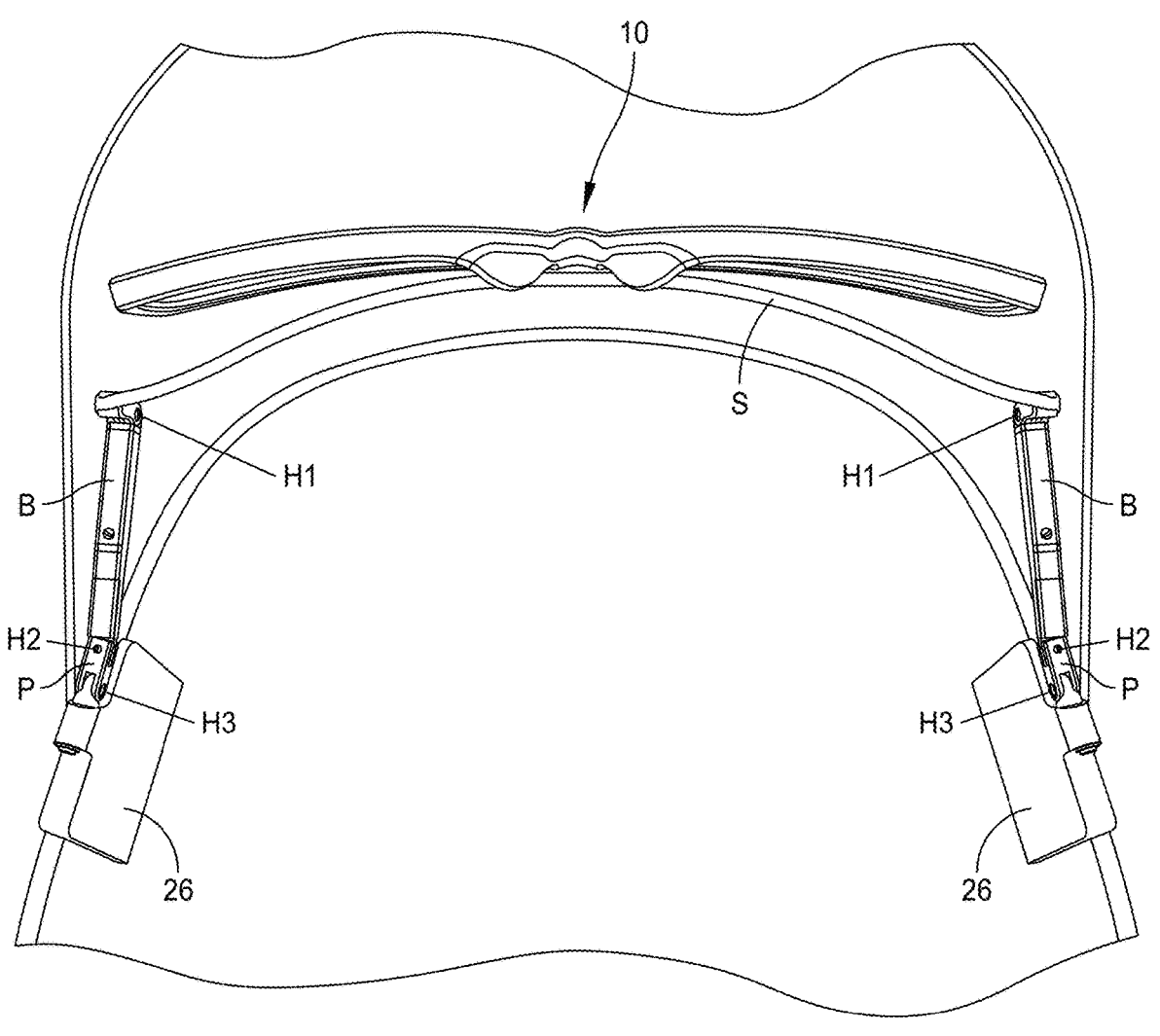
FIG. 25 is a bottom view of sunglasses attached to a hat shown with eyeglass shades flipped in the downward position.
Figure 26:
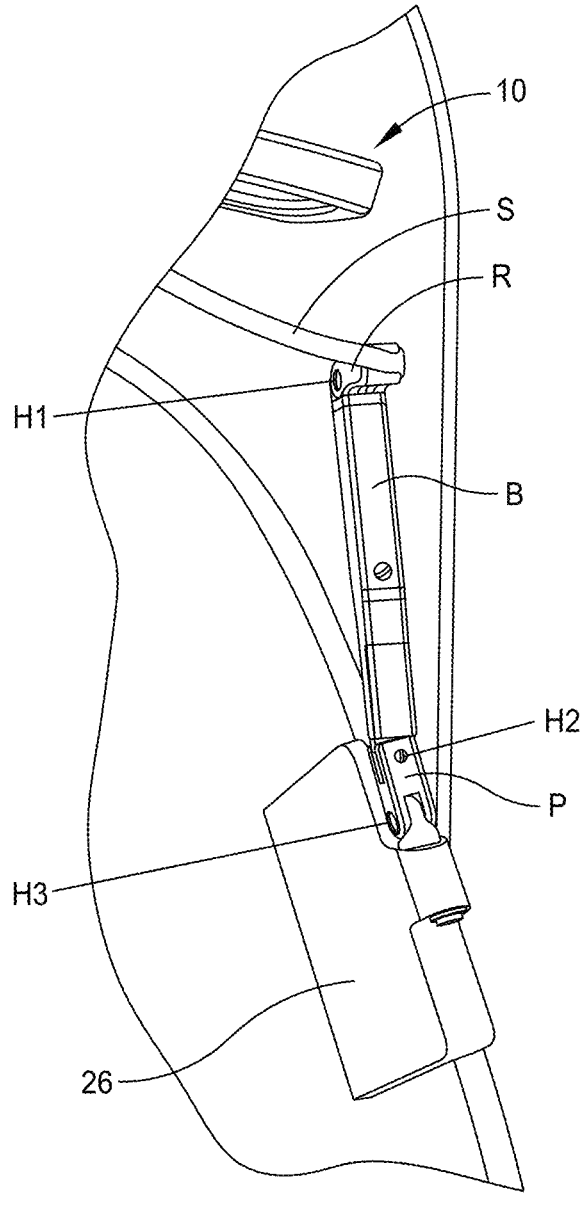
FIG. 26 is an enlarged view of the left side of the sunglass frame.

FIG. 24 is a front perspective view of an alternate embodiment of the invention showing two of the three hinges; namely, hinge/pivot H2 and hinge/pivot H3. FIG. 25 is a bottom view of the sunglasses attached to a hat and showing the eyeglass shades flipped to the downward position. In FIG. 25 the eyeglasses 10 shown are attached to an elongated support bar S. The support bar S can be attached to the eyeglass in a variety of ways. This attachment can be permanent but is preferably arranged so that different eyeglass frames can be substituted as described hereinafter in connection with FIGS. 30-34. In FIG. 25 it is also noted that the attachment of the elongated support bar S is only at a center section of the eyeglass frame which is the only area where the attachment occurs. Note in FIG. 25 that the ends of the bar S are not attached to the eyeglass frame. This allows for ready attachment of the temple pieces. FIG. 26 is an enlarged view of the left side of the sunglass frame. This illustrates the support bar S and the clip 26 that is supported to the cap.

Figure 27:
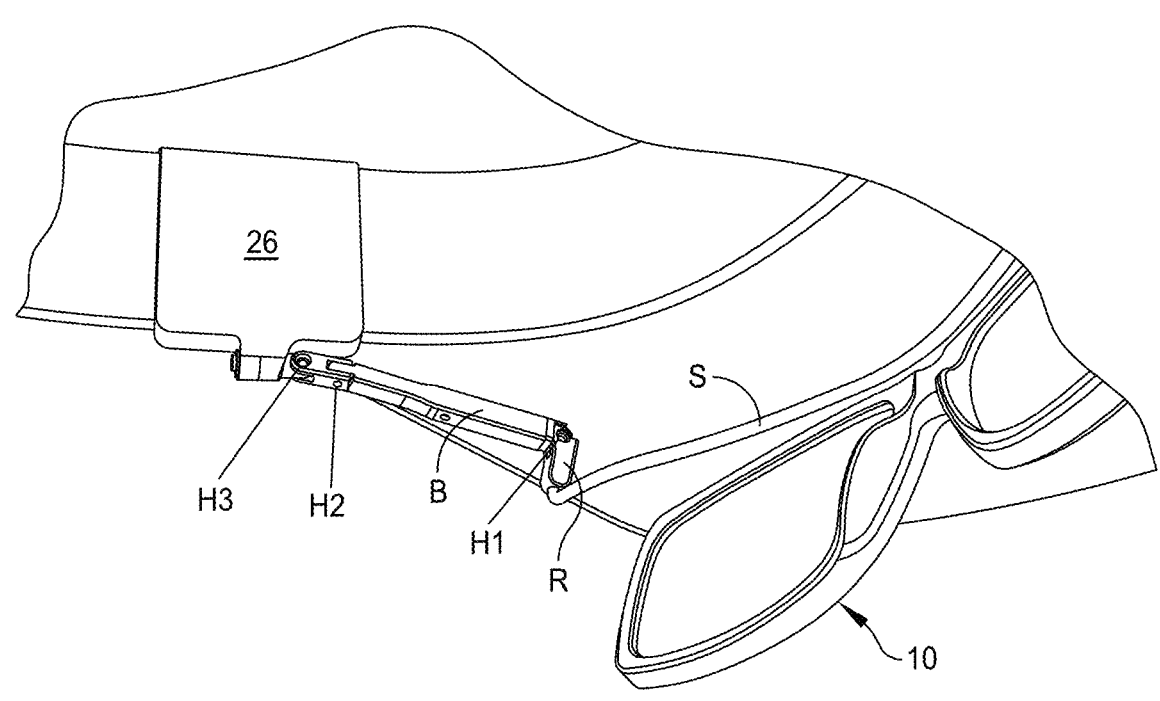
FIG. 27 is a perspective view of the sunglasses attached to a hat shown with eyeglass shades flipped in the downward position.
Figure 28:
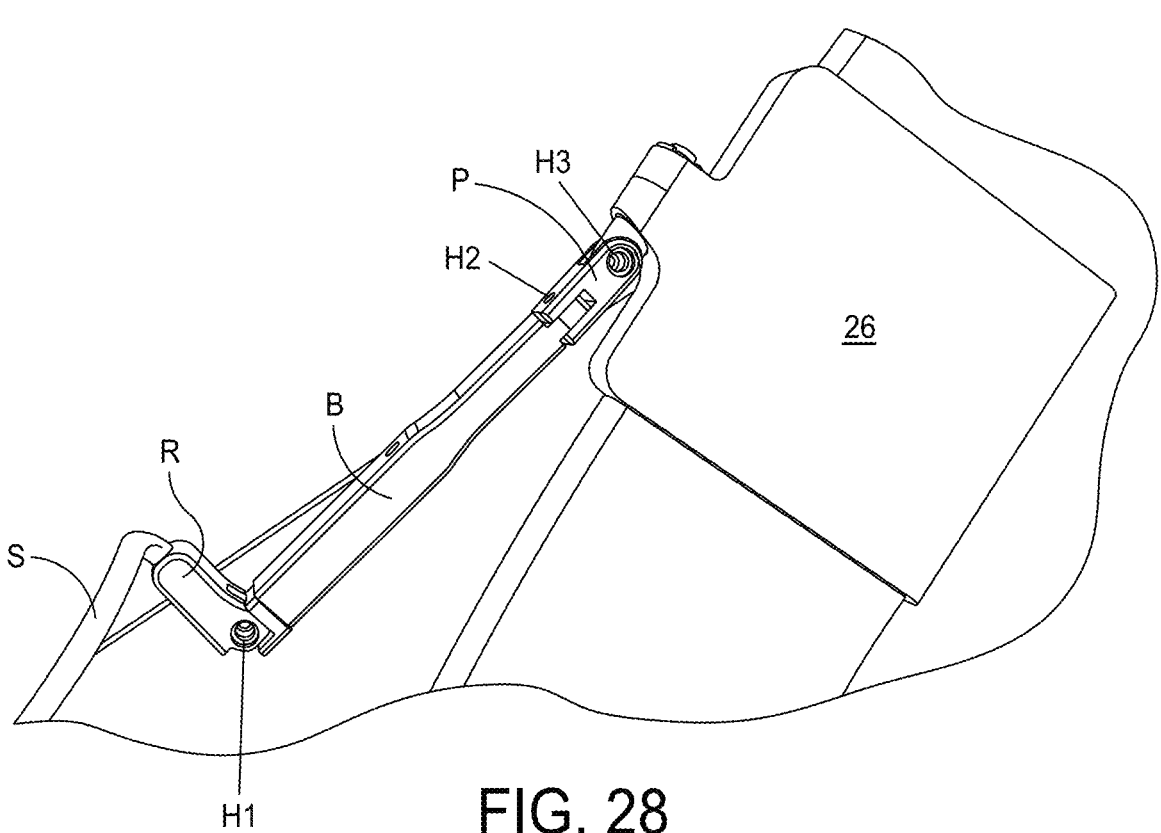
FIG. 28 is an enlarged perspective view of sunglasses attached to a hat shown with eyeglass shaded flipped in the downward position.
Figure 29:
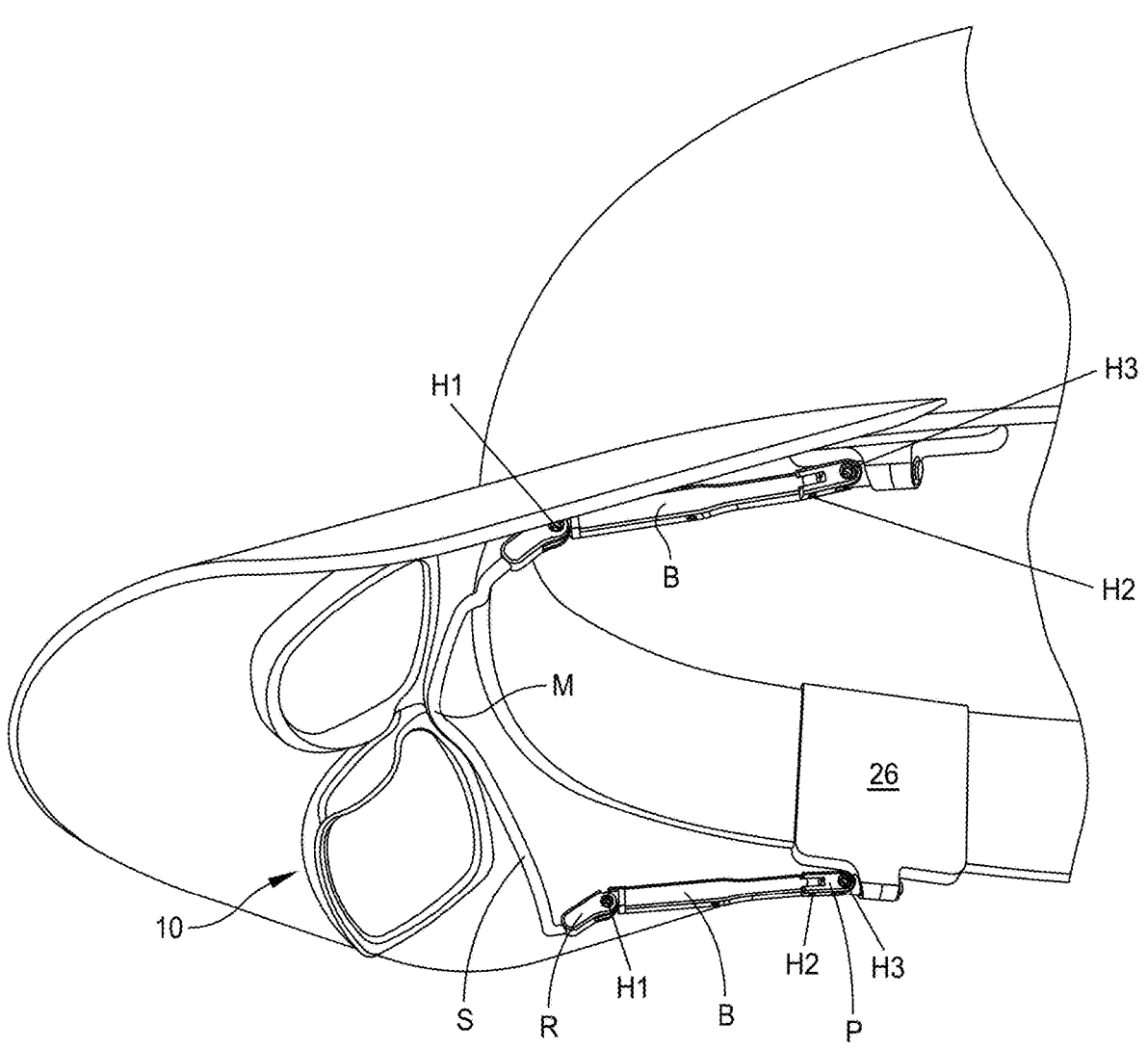
FIG. 29 is a perspective view of sunglasses attached to a hat shown with eyeglass shades flipped in the upward position.

FIG. 27 is a perspective view of the sunglasses 10 attached to a hat shown with the eyeglass shades flipped to a downward position. FIG. 28 is an enlarged perspective view of the sunglasses 10 attached to a hat or cap and with the eyeglass shades flipped to the downward position. FIG. 29 is a perspective view of the sunglasses 10 attached to a hat or cap and with the eyeglass shades flipped to an upward position.

In the version illustrated in FIGS. 24-29, there is a clear illustration of the temple bar B and at opposite ends thereof the end pieces P and R. The hinge H1 is provided between the temple bar B and the end piece R. The hinge H2 is provided between the temple bar B and the end piece P. The hinge H3 is provided between the end piece P and the clip 26. Refer in particular to the enlarged view of FIG. 28.

In order to provide a wide range of adjustment, the hinges H1, H2 and H3 are arranged in the following manner. The axis of the hinge H1 is substantially in parallel to the axis of the hinge H3. On the other hand, the hinge H2 has an axis that is perpendicular to the axes H1/H3.

Figure 30:
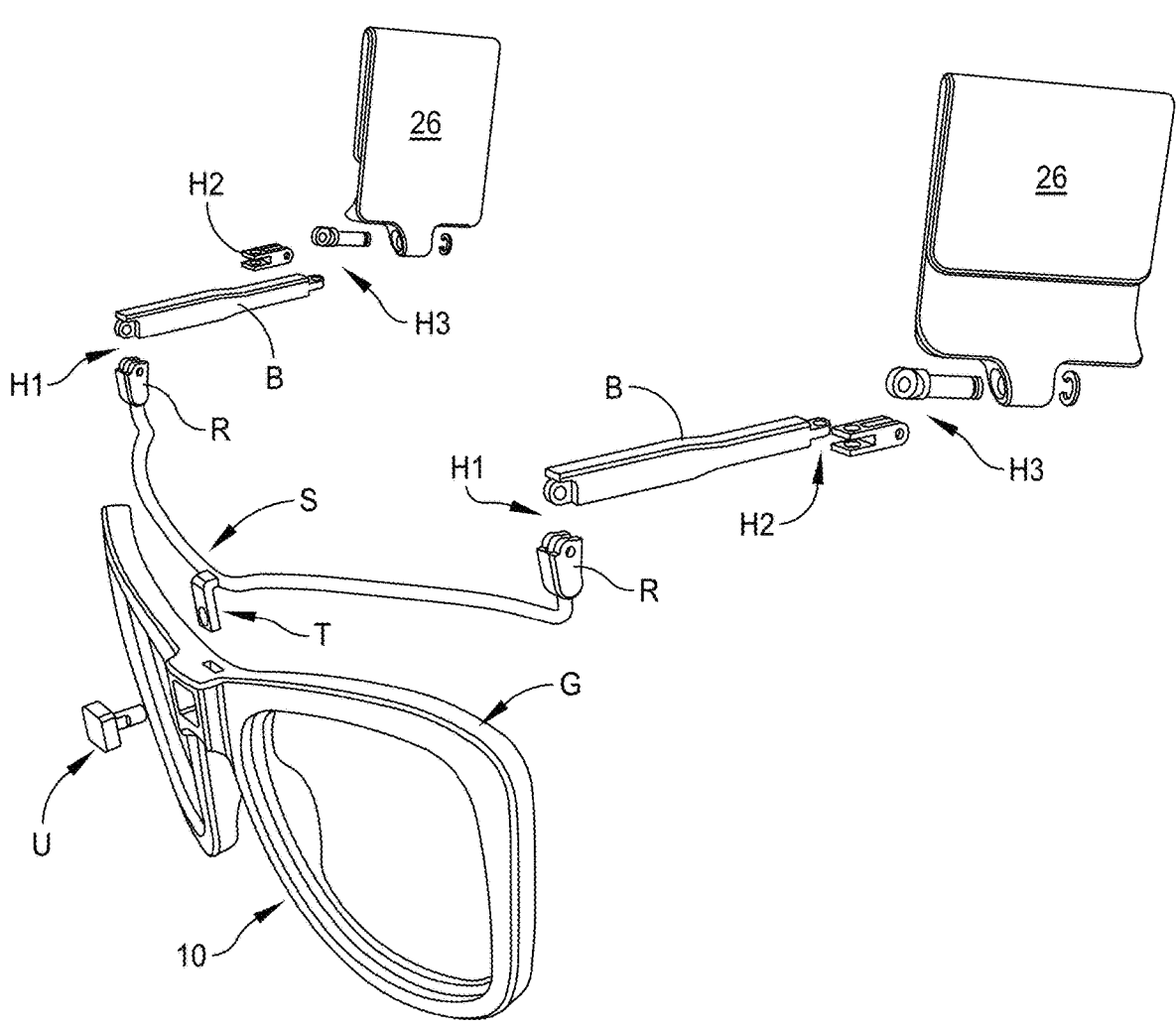
FIG. 30 is an exploded perspective view of a further embodiment of the present invention in which interchangeable eyeglass frames can be employed.

Reference is now made to a further embodiment of the present invention described in FIGS. 30-24. The purpose of this embodiment is to allow different eyeglass frames to be interchanged with the use of a simple button and tab arrangement. The eyeglass frame G is illustrated in FIG. 30. Above the eyeglass frame G is provided the elongated support bar S. FIG. 30 also illustrates a first hinge H1 connected between the temple bar B and the end piece R. FIG. 30 also illustrates the hinge H2 and the hinge H3 similar to the arrangement illustrated in FIGS. 24-29.

The elongated support bar S is supported with a downwardly extending tab T. This tab T is meant for selective engagement with the eyeglass frame G by virtue of the tab T being inserted into the hole T2 in the enlarged section V at the center of the eyeglass frame.

Figure 31:
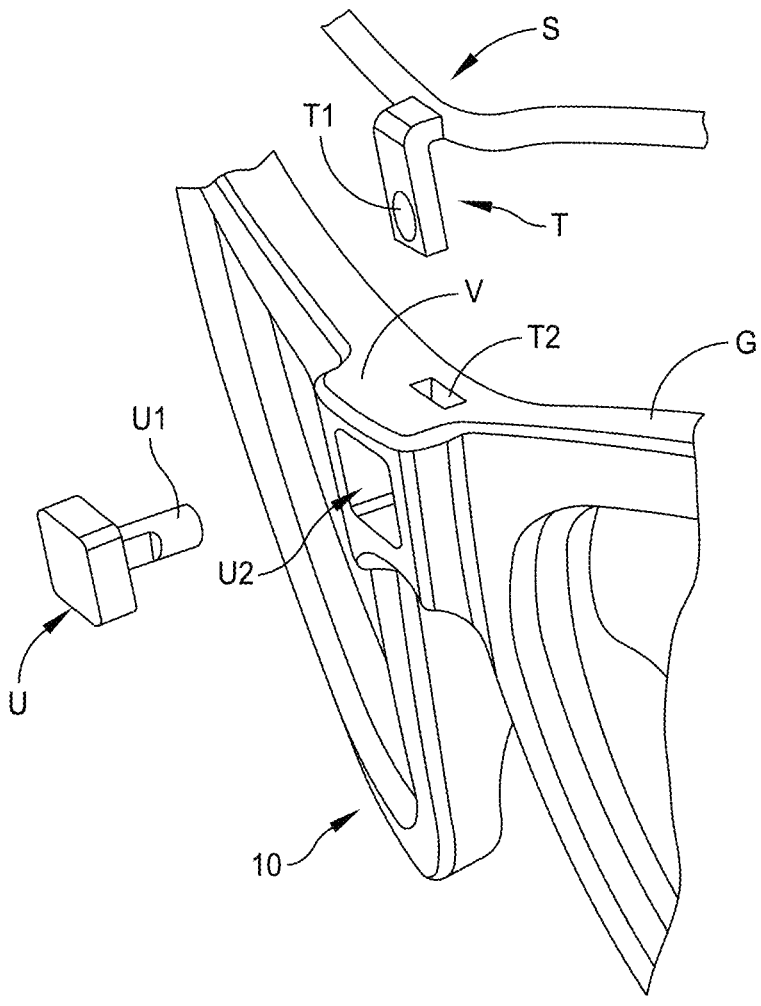
FIG. 31 is an expanded partial perspective view showing the manner in which the elongated support bar is attached with the eyeglass frame.
Figure 32:
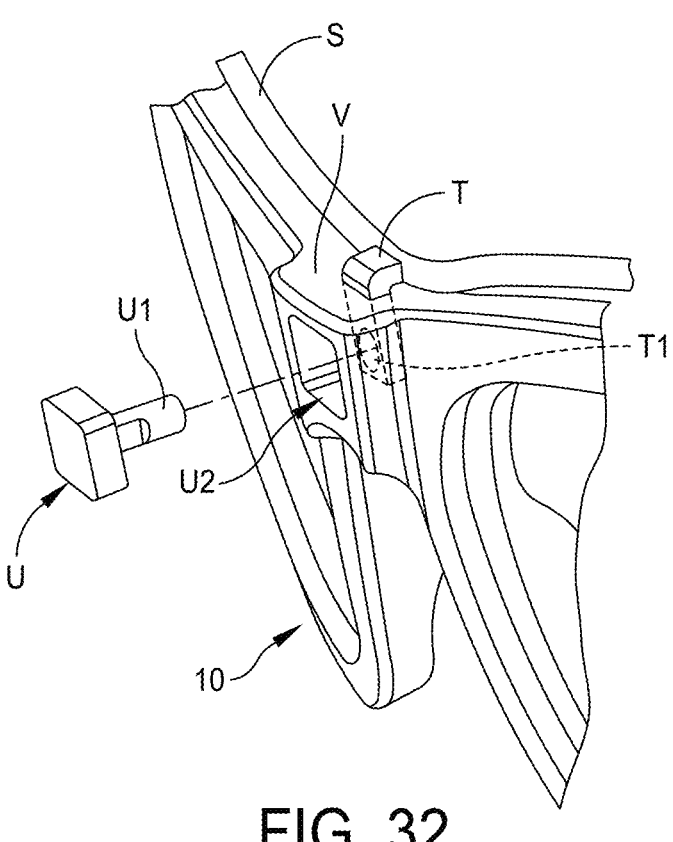
FIG. 32 is a fragmentary perspective view showing a further step where the tab of the elongated support bar has been inserted.
Figure 33:
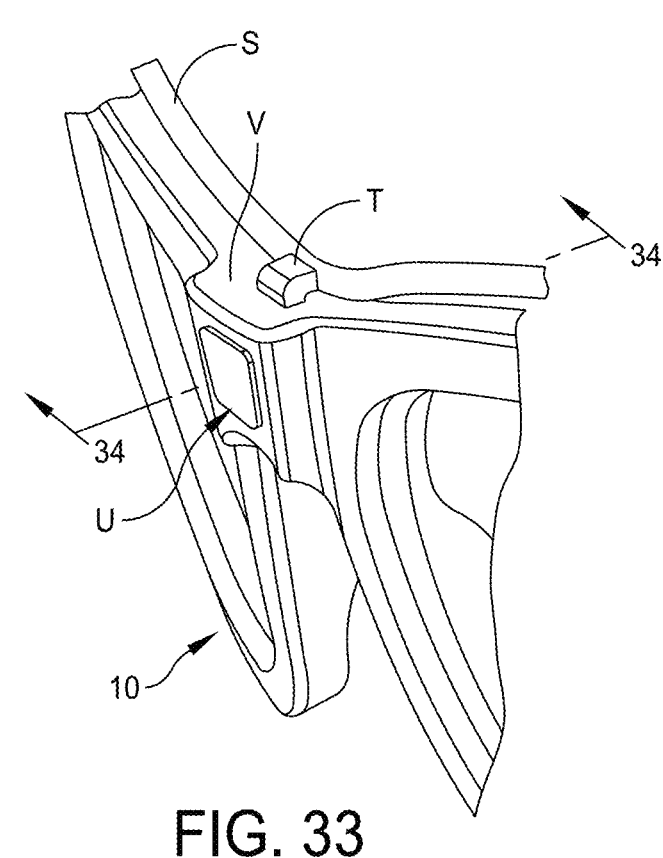
FIG. 33 is a fragmentary perspective view showing the final step with the button being inserted for engagement with the tab.

FIGS. 31-33 are progressive fragmentary perspective views showing the manner in which the eyeglass frame is secured with the elongated support bar S. FIG. 31 illustrates a first step where the eyeglass frame G is about to be engaged with the tab T that is fastened to the support bar S. FIG. 31 also illustrates the engagement button U in position but not yet inserted into the frame hole U2.

Figure 34:
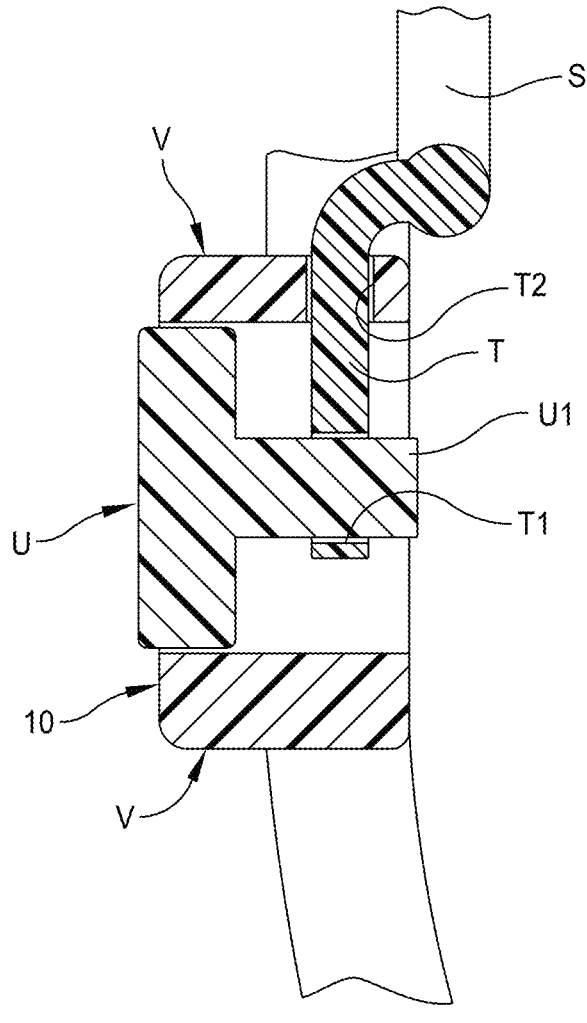
FIG. 34 is a cross-sectional view taken along line 34-34 of FIG. 33.

FIG. 32 illustrates the tab T having been inserted into the hole T2 and the button U positioned and about to be inserted into the hole U2. Finally, FIG. 33 illustrates the button U inserted into the hole U2. The cross-sectional view of FIG. 34 illustrates the final position wherein the button U is engaged with the hole T1 in the tab T.

The button U may be a separate member that is used at the time that a new eyeglass frame is to be adapted. On the other hand, the button U may be more permanently attached to the eyeglass frame in a position where it can be either withdrawn or inserted for engagement with the tab T. For this purpose, the button U and its associated post U1 may be provided with grooves or indents that allow it to slide into position between a fully engaged position and a partially withdrawn position; but at all times having the button U positioned on the eyeglass frame G.

| Reference Numbers | |
| --- | --- |
| glasses | 10 |
| headband | 12 |
| cap | 14 |
| interior rim of the cap | 15 |
| frame of the glasses | 16 |
| upper edge of the rim | 17 |
| eyepiece | 18 |
| temples | 20 |
| temple connector | 22 |
| temple pivot | 24 |
| temple pivot | 25 |
| clip | 26 |
| clip flanges | 27 |
| clip indentations | 28 |
| clip turned end | 29 |
| clip base | 30 |
| clip bump | 31 |
| clip side lips | 33 |
| temple supportpiece | 34 |
| threaded end of temple support | 35 |
| non-slip insert | 36 |
| insert side flanges | 38 |
| insert bridge | 39 |
| insert indentations | 40 |
| insert bump | 42 |
| pad | 44 |
| eyeglass frame | 50 |
| respective temples | 54 |
| temple hinge | 55 |
| temple ends | 56 |
| frame slots | 58 |
| hinge/pivot | H1 |
| hinge/pivot | H2 |
| hinge/pivot | H3 |
| temple bar | B |
| end piece | P |
| end piece | R |
| elongated support bar | S |
| glass frame | G |
| tab | T |
| tab hole | T1 |
| frame hole | T2 |
| button | U |
| button post | U1 |
| frame hole | U2 |
| enlarged center section of frame G | V |

Having now described a limited number of embodiments of the present invention, it should now be apparent to those skilled in the art that numerous other embodiments and modifications thereof are contemplated as falling within the scope of the present invention, as defined by the appended claims.

The invention claimed is:

1. An eyeglass assembly for the mounting of eyeglasses from a cap, wherein the cap includes an interior peripheral rim that defines an upper rim edge that the eyeglasses are supported from, and wherein said eyeglasses include a pair of eye pieces and associated pair of temples, said eyeglass assembly comprised of:

an eyeglass frame;

a clip that includes a pair of clip side flanges connected at a clip bridge piece so that the clip is formed substantially in an inverted U-shape for disposition over the upper rim edge;

at least one hinge for support of the temple relative to the clip;

said temple having opposed ends including an end supported from the clip and another end;

an elongated support bar having a center section that is attached with a center section of the eyeglass frame;

said elongated support bar having opposed ends that attach with the respective other end of each temple;

wherein the eyeglass frame is selectively removable from the elongated support bar in order to exchange eyeglass frames;

wherein the elongated support bar has a downwardly extending tab attached from the center section of the elongated support bar;

wherein the center section of the eyeglass frame is enlarged in comparison to the rest of the eyeglass frame, and further including a hole in the enlarged center section dimensioned to receive the tab in order to interlock the elongated support bar with the eyeglass frame;

further including an engagement button that engages with a facial surface of the enlarged center section of the eyeglass frame, and for engagement with the tab in order to lock the elongated support bar with the eyeglass frame.

2. The eyeglass assembly of claim 1 including at least two hinges at opposed ends of the temple.

3. The eyeglass assembly of claim 1 including one hinge at each end of the elongated support bar.

4. The eyeglass assembly of claim 1 wherein the engagement button has a post that engages with a hole in the tab.

5. The eyeglass assembly of claim 1 wherein the elongated support bar attaches only at the tab to the eyeglass frame.

6. The eyeglass assembly of claim 5 including one hinge at each end of the elongated support bar.

7. A combination of a cap that is worn by a user, an eyeglass frame and an eyeglass assembly for the mounting of the eyeglass frame from the cap, wherein the cap includes an interior peripheral rim that defines an upper rim edge that the eyeglasses are supported from, and wherein said eyeglass frame include a pair of eye pieces and associated pair of temples, said eyeglass assembly comprised of:

a clip that includes a pair of clip side flanges connected at a clip bridge piece so that the clip is formed substantially in an inverted U-shape for disposition over the upper rim edge;

said temple having opposed ends including an end supported from the clip and another end;

an elongated support bar having a center section that is attached with a center section of the eyeglass frame;

said elongated support bar having opposed ends that attach with the respective other end of each temple;

wherein the eyeglass frame is selectively removable from the elongated support bar in order to exchange eyeglass frames, and the elongated support bar center section is attached only at a center section of the eyeglass frame;

wherein the elongated support bar has a downwardly extending tab attached from the center section of the elongated support bar;

wherein the center section of the eyeglass frame is enlarged in comparison to the rest of the eyeglass frame, and further including a hole in the enlarged center section dimensioned to receive the tab in order to interlock the elongated support bar with the eyeglass frame;

further including an engagement button that engages with a facial surface of the enlarged center section of the eyeglass frame, and for engagement with the tab in order to lock the elongated support bar with the eyeglass frame.

8. The combination of claim 7 wherein each temple includes at opposite ends thereof end pieces (P and R), and further including a hinge (H1) that is provided between a temple bar (B) and the end piece (R), and a second hinge (H2) that is provided between the temple bar (B) and the end piece (P).

9. The combination of claim 8 further including a hinge (H3) is provided between the end piece (P) and the clip.

10. The combination of claim 7 wherein the engagement button has a post that engages with a hole in the tab.

11. The combination of claim 7 wherein the elongated support bar attaches only at the tab to the eyeglass frame.

12. The combination of claim 11 including one hinge at each end of the elongated support bar.

13. A combination of a cap that is worn by a user, an eyeglass frame and an eyeglass assembly for the mounting of the eyeglass frame from the cap, wherein the cap includes an interior peripheral rim that defines an upper rim edge that the eyeglasses are supported from, and wherein said eyeglass frame include a pair of eye pieces and associated pair of temples, said eyeglass assembly comprised of:

a clip that includes a pair of clip side flanges connected at a clip bridge piece so that the clip is formed substantially in an inverted U-shape for disposition over the upper rim edge;

said temple having opposed ends including an end supported from the clip and another end;

said eyeglass frame having an elongated upper support surface;

an elongated support bar that extends over and along the elongated upper support surface of the eyeglass frame;

said elongated support bar having opposed ends that attach with the respective an other end of each temple;

wherein the eyeglass frame is selectively removable from the elongated support bar in order to exchange eyeglass frames;

wherein the elongated support bar has a downwardly extending tab depending from the elongated support bar;

wherein the elongated upper support surface of the eyeglass frame has a hole that is dimensioned to receive the downwardly extending tab;

and an engagement button that engages with a facial surface of the eyeglass frame, and for engagement with the tab in order to lock the elongated support bar with the eyeglass frame.

14. The combination of claim 13 wherein the engagement button has a post that engages with a hole in the tab.

15. The combination of claim 13 wherein the elongated support bar attaches only at the tab to the eyeglass frame.

16. The combination of claim 13 including one hinge at each end of the elongated support bar.

17. The combination of claim 13 including at least two hinges at opposed ends of the temple.

18. The combination of claim 13 including one hinge at each end of the elongated support bar.

* * * * *